United States Patent [19]

Eichenauer et al.

[11] Patent Number: 4,740,573

[45] Date of Patent: Apr. 26, 1988

[54] SULPHUR-CONTAINING POLYMERS

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen, Fed. Rep. of Germany

[21] Appl. No.: 827,401

[22] Filed: Feb. 10, 1986

[30] Foreign Application Priority Data

Feb. 20, 1985 [DE] Fed. Rep. of Germany ....... 3505747

[51] Int. Cl.$^4$ ............... C08L 25/12; C08L 25/14; C08L 33/06; C08L 33/18
[52] U.S. Cl. ............... 526/224; 526/329.2; 526/329.3; 526/329.7; 526/342
[58] Field of Search ............... 526/224, 329.3, 342, 526/329.2, 329.7

[56] References Cited

U.S. PATENT DOCUMENTS

| | | | |
|---|---|---|---|
| 3,828,013 | 8/1974 | Nield | 526/224 |
| 3,915,942 | 10/1975 | Tamura | 526/224 |
| 3,960,824 | 1/1976 | Hicks | 526/209 |
| 4,082,818 | 4/1978 | Coffey et al. | 526/224 |
| 4,246,382 | 1/1981 | Honda et al. | 526/224 |
| 4,510,287 | 4/1985 | Wu | 525/86 |
| 4,587,313 | 5/1986 | Ohta et al. | 526/224 |

FOREIGN PATENT DOCUMENTS 2145498  2/1973  France .

*Primary Examiner*—Allan Lieberman
*Attorney, Agent, or Firm*—Connolly & Hutz

[57]  ABSTRACT

Sulphur-containing polymers of styrene, α-methyl styrene, p-methyl styrene, vinyl toluene, acrylonitrile or methyl methacrylate or mixtures thereof with a limiting viscosity of from 2 to 15 ml/g (measured in dimethyl formamide at 25° C.) and a sulphur content of from 1.15 to 3.95% by weight, whereby at least 90% by weight of the incorporated sulphur is present as a constituent of terminal $C_{1-18}$-thioalkyl groups.

11 Claims, No Drawings

SULPHUR-CONTAINING POLYMERS

The present invention provides sulphur-containing polymers with terminal thioalkyl groups which have a limiting or as it is commonly referred to intrinic viscosity of from 2 to 15 ml/g (measured in dimethyl formamide, hereafter "DMF", at 25° C.) and a sulphur content of from 1.15 to 3.95% by weight.

ABS polymers have a good property combination of high impact strength, good chemical-resistance and easy processibility. Inspite of this, in special cases, such as with ABS mixtures with a high rubber content, a flowability of the thermoplastic material can result which is insufficient in practice for demands of modern processing technology. Remedy through addition of low molecular weight flow auxiliaries such as ethylene diamine bisstearoyl amide or calcium stearate often results in strength losses, reduced dimensional stability under heat or migration of the added lubricant.

An improvement in the flowability by increasing the processing temperature can usually only be obtained at the cost of a partial thermooxidative degradation in the rubber phase.

The need thus existed for a thermoplastic material which can be used to improve the flowability of ABS thermoplast resins, which has no negative influences on the ABS properties, particularly strength and dimensional stability under heat, and which opposes a thermooxidative decomposition of the rubber phase.

The invention provides sulphur-containing polymers of styrene, $\alpha$-methyl styrene, p-methyl styrene, vinyl toluene acrylonitrile or methyl methacrylate or mixtures thereof with a limiting or intrinsic viscosity of from 2 to 15 ml/g, preferably from 3 to 12 ml/g (measured in DMF at 25° C.) and a sulphur content of from 1.15 to 3.95% by weight, preferably from 1.25 to 2.40% by weight, whereby at least 90% by weight of the incorporated sulphur is present as a constituent of terminal $C_{1-18}$-thioalkyl groups.

Preferred sulphur-containing polymers are those which have a good compatibility with ABS polymers, particularly copolymers or terpolymers of (nuclear or side-chain substituted) styrene.

The production of the polymers according to the invention can take place in a known manner by solution-, suspension-or emulsion polymerisation or by a combination of these processes, the polymerisation in emulsion is preferred.

This is preferably carried out using anionic emulsifiers such as sodium, potassium or ammonium salts of long-chain fatty acids having from 10 to 20 carbon atoms, for example potassium oleate, alkyl sulphates having from 10 to 20 carbon atoms, alkyl aryl sulphonates having from 10 to 20 carbon atoms or alkali or ammonium salts of diproportionated abietic acid.

The polymerisation reaction can be carried out in a wide temperature range, it preferably takes place between 30° C. and 100° C., particularly perferably between 50° C. and 80° C.

Suitable radical-forming initiators are organic and inorganic peroxides, inorganic persulphates such as potassium persulphate, azoinitiators such as azobisisobutyronitrile, as well as redox systems which consist of an oxidizing agent, preferably a peroxide, and a reducing agent. Potassium persulphate is used as preferred intitiator, the quantities for use are between 0.1 and 0.5% by weight (based on the monomer quantity).

The introduction of the terminal thioalkyl groups takes place by polymerisation of a mixture of monomers and $C_{1-18}$-alkyl mercaptan, whereby the mercaptan acting as chain transferrer is incorporated as a terminal thioalkyl group.

The sulphur content introduced by terminal thioalkyl groups must thereby be at least 90% by weight of the total sulphur present in the polymer. The content of sulphur possibly still present in the polymer, introduced, for example, by incorporation of initiator fragments or by graft reaction of sulphur-containing emulsifiers, is less than 10% by weight of the total sulphur content in the polymer.

Examples of $C_{1-18}$-alkyl mercaptans which can be used are ethyl mercaptan, n-propyl mercaptan, n-butyl mercaptan, tert.-butyl mercaptan, n-pentyl mercaptan, n-hexyl mercaptan, n-octyl mercaptan, n-decyl mercaptan, n-dodecyl mercaptan, tert.-dodecyl mercaptan, n-hexadecyl mercaptan and n-octadecyl mercaptan.

Preferred alkyl mercaptans are tert.-dodecyl mercaptan and n-dodecyl mercaptan or mixtures thereof.

Sulphur-containing polymer of this invention can be prepared by polymerizing a mixture of
(Ia) from 50 to 80 parts by weight, preferably from 55 to 75 parts by weight of ($\alpha$-methyl)styrene and/or p-methyl styrene or vinyl toluene,
(Ib) from 10 to 30 parts by weight, preferably from 15 to 27.5 parts by weight of (meth)acrylonitrile and
(Ic) as many parts by weight of a C1-18-alkyl mercaptan or mixtures thereof as produce a sulphur content of from 1.15 to 3.95% by weight in the polymer Usually, for component (Ic), it is sufficient to use from 7.5 to 25 parts by weight of tert.-dodecyl mercaptan and/or n-dodecyl mercaptan or mixtures thereof.

Sulphur-containing polymer of this invention can also be prepared by polymerizing a mixture of
(IIa) from 25 to 75 parts by weight, preferably from 30 to 70 parts by weight of ($\alpha$-methyl)styrene and/or p-methyl styrene or vinyl toluene.
(IIb) from 25 to 75 parts by weight, preferably from 30 to 70 parts by weight of methyl methacrylate and
(IIc) as many parts by weight of a $C_{1-18}$-alkyl mercaptan or mixtures thereof as produce a sulphur content of from 1.15 to 3.95% by weight in the polymer.

Usually, for component (IIc), it is sufficient to use from 7.5 to 25 parts by weight, preferably from 8 to 15 parts by weight of tert.-dodecyl mercaptan and/or n-dodecyl mercaptan or mixtures thereof.

Sulphur-containing polymer of this invention can also be prepared by polymerizing a mixture of
(IIIa) from 10 to 60 parts by weight, preferably from 20 to 50 parts by weight of ($\alpha$-methyl) styrene and/or p-methyl styrene or vinyl toluene,
(IIIb) from 10 to 60 parts by weight, preferably from 20 to 50 parts by weight of methyl methacrylate,
(IIIc) from 10 to 30 parts by weight, preferably from 5 to 27.5
parts by weight of (meth)acrylonitrile and
(IIId) as many parts by weight of a $C_{1-18}$-alkyl mercaptan or mixtures thereof as produce a sulphur content of from 1.15 to 3.95% by weight in the polymer.

Usually for component (IIId), it is sufficient to use from 7.5 to 25 parts by weight, preferably from 8 to 15 parts by weight of tert.-dodecyl mercaptan and/or n-dodecyl mercaptan or mixtures thereof.

Sulphur-containing polymer of this invention can also be prepared by polymerizing a mixture of (IVa) from 50 to 80 parts by weight, preferably from 55 to 75 parts by weight of methyl methacrylate, (IVb) from 10 to 30 parts by weight, preferably from 15 to 27.5 parts by weight of (meth)acrylonitrile and (IVc) as many parts by weight of a $C_{1-18}$-alkyl mercaptan or mixtures thereof as produce a sulphur content of from 1.15 to 3.95% by weight in the polymer.

Usually, for component (IVc), it is sufficient to use from 7.5 to 25 parts by weight, preferably from 8 to.15 parts by weight of tert. dodecyl mercaptan and/or n-dodecyl mercaptan or mixtures thereof.

Thus, the invention also relates to a process for the production of sulphur-containing polymers of styrene, α-methyl styrene, p-methyl styrene, vinyl toluene, acrylonitrile or methyl methacrylate or mixtures thereof with a limiting viscosity of from 2 to 15 ml/g (measured in dimethyl formamide at 25°20 C.), characterized in that the monomer or the monomer mixture is polymerized in the presence of a $C_{1-18}$-alkyl mercaptan or mixtures thereof in quantities of from (0.503; X+1.222) % by weight to (1.728; X+4.197) % by weight (based on the sum of the monomer and mercaptan quantity), whereby X-represents the number of carbon atoms in the alkyl mercaptan.

The sulphur-containing polymers according to the invention which have limiting viscosities of from 2 to 15 ml/g (measured in DMF at 25° C.), are suitable as an agent for improving the flowability of ABS polymers in thermoplastic processing. They are thereby added to the ABS polymers in quantities of from 0.5 to 15% by weight, preferably from 1 to 10% be weight and particularly preferably from 1.5 to 7.5% by weight. Owing to their content of terminal thioalkyl groups, they are, on the one hand, very effective as oxygen catchers, whereby the thioether grouping is converted into sulphoxide or sulphone groupings, on the other hand, the alkyl group, particularly a longer-chain grouping such as the dodecyl radical, contributes to an increased effectiveness as flowability improver. Thus, the sulphur-containing polymer of this invention is also used for protection of ABS polymers against thermoxidative damage.

Thermoplastic mixtures containing sulphur-containing polymers are also part of the present invention. Those include thermoplastic mixtures containing graft polymers (A), copolymers (B) and polymers (C), characterised in that they contain a sulphur-containing polymer (C) of styrene, α-methyl styrene, p-methyl styrene, vinyl toluene acrylonitrile or methyl methacrylate or mixtures thereof with a sulphur content, introduced via terminal $C_{1-18}$-thioalkyl groups, of from 1.15 to 3.95% by weight and a limiting viscosity of from 2 to 15 ml/g (measured in dimethyl formamide at 25° C.) in quantities of from 0.5 to 15 parts by weight, based in each case on 100 parts by weight of a mixture of graft polymers (A), copolymers (B) and polymers (C). Polymer (C) can be produced by polmerizing a mixture of (a) from 50 to 80 parts by weight, preferably from 55 to 75 parts by weight of (α-methyl)styrene and/or p-methyl styrene or vinyl toluene, (b) from 10 to 30 parts by weight, preferably from 15 to 27.5 parts by weight of (meth)acrylonitrile and (c) from 7.5 to 25 parts by weight, preferably from 8 to 15 parts by weight of tert.-dodecyl mercaptan and/or n-dodecyl mercaptan or mixtures thereof.

Especially suitable thermoplastic mixtures contain
(A) from 5 to 80 parts by weight of a graft polymer consisting of
(A)1 from 5 to 90 parts by weight of a mixture of (A)1)1) from 50 to 90% by weight of styrene, α-methylstyrene, nuclear-substituted styrene, methyl methacrylate or mixtures thereof and (A)1)2) from 50 to 10% by weight of (meth)acrylonitrile, methyl methacrylate, N-substituted maleimide or mixtures thereof, on (A)2) from 90 to 10 parts by weight of a rubber with a glass temperature $\leq 10°$ C., and (B) from 5 to 95 parts by weight of a thermoplastic coplymer with a $\overline{M}_w$ of from 15 000 to 200 000 (measured by light scatter or sedimentation) consisting of (B)1) from 50 to 95% by weight of styrene, α-methyl styrene, nuclear-substituted styrene, methyl methacrylate or mixtures thereof, and (B)2) from 50 to 5% by weight of (meth)acrylonitrile, methyl methacrylate, maleic acid anhydride, N-substituted maleimide or mixtures thereof, whereby the sum of the parts by weight of graft polymer (A), copolymer (B) and polymer (C) is in each case again 100.

EXAMPLES

The invention is described in more detail in the following Examples. The given parts are parts by weight and in each case relate to solid constituents or polymerisable constituents.

Example 1

3.06 parts of styrene, 1.19 parts of acrylonitrile and 0.75 parts of tert.-dodecyl mercaptan are emulsified in 68 parts of water under nitrogen, together with 0.08 parts of the sodium salt of the disproportionated abietic acid, whereupon 0.3 parts of potassium persulphate (dissolved in 24 parts of water) are added and the mixture is heated to 65° C. A mixture of 58.14 parts of styrene, 22.61 parts of acrylonitrile and 14.25 parts of tert.-dodecyl mercaptan as well as a solution of 1.92 parts of the sodium salt of the disproportionated abietic acid in over 25 parts of water are metered in over the course of 4 h, whereby the reaction temperature of 65° C. is maintained. After a period of secondary reaction, the latex is coagulated in a cold magnesium sulphate/acetic acid solution. The polymer obtained after drying at 70° C., under vacuum, in a yield of 97%, has a sulphur content of 2.3% and a limiting viscosity of 6.7 ml/g (in dimethyl formamide at 25° C.).

Example 2

3.10 parts of α-methyl styrene, 1.40 parts of acrylonitrile and 0.50 parts of tert.-dodecyl mercaptan are emulsified in 80 parts of water under nitrogen together with 0.08 parts of the sodium salt of a $C_{9-18}$-alkyl sulphonic acid mixture, treated with 0.3 parts of potassium persulphate (dissolved in 15 parts of water) and heated to 70° C. A mixture of 59.00 parts of α-methyl styrene, 26.50 parts of acrylonitrile and 9.5 parts of tert.-dodecyl mercaptan as well as a solution of 1.92 parts of the potassium salt of a $C_{9-18}$-alkyl sulphonic acid mixture in 25 parts of water are then metered in over the course of 4 h, whereby the reaction temperature of 70° C. is maintained. After a period of secondary reaction, the latex is coagulated in a cold calcium chloride solution. After drying under vacuum at 70° C., a polymer is obtained in a yield of 95%, with a sulphur content of 1.5% and a limiting viscosity of 10.9 ml/g (in dimethyl formamide at 25° C.).

Example 3

A mixture of 2.25 parts of styrene, 2.25 parts of methyl methacrylate and 0.50 parts of tert.-dodecyl mercaptan is emulsified in 80 parts of water under nitrogen with 0.08 parts of the sodium salt of the disproportionated abietic acid, treated with 0.3 parts of potassium persulphate (dissolved in 15 parts of water) and heated to 65° C. A mixture of 42.75 parts of styrene, 42.75 parts of methyl methacrylate and 9.5 parts of tert.-dodecyl mercaptan as well as a solution of 1.92 parts of the sodium salt of the disproportionated abietic acid in 25 parts of water are metered in over the course of 4 h, whereby the reaction temperature is maintained at 65° C. After a period of secondary reaction, the latex is coagulated in a cold magnesium sulphate/acetic acid solution and the polymer is dried under vacuum at 70° C. The polymer (yield 97%) has a sulphur content of 1.5% and a limiting viscosity of 6.0 ml/g (in DMF at 25° C.).

Example 4

3.15 parts of methyl methacrylate, 1.35 parts of acrylonitrile and 0.50 parts of tert.-dodecyl mercaptan are emulsified in 80 parts of water under nitrogen together with 0.08 parts of the sodium salt of the disproportionated abietic acid, treated with 0.3 parts of potassium persulphate (dissolved in 15 parts of water) and heated to 65° C. A mixture of 59.85 parts of methyl methacrylate, 25.65 parts of acrylonitrile and 9.5 parts of tert.-dodecyl mercaptan as well as a solution of 1.92 parts of the sodium salt of the disproportionated abietic acid are in 25 parts of water are metered on over the course of 4h, whereby the reaction temperature of 65° C. is maintained. After period of secondary reaction the latex is coagulated in a cold magnesium sulphate/acetic acid solution and the polymer is dried under vacuum at 70° C. The polymer obtained in a yield of 96% has a sulphur content of 1.5% and a limiting viscosity of 9.5 ml/g (in DMF at 25° C.).

Example 5

An ABS polymer, consisting of 40 parts of weight of a graft polymer of 36 parts by weight of styrene and 14 parts by weight of acrylonitrile on 50 parts by weight of a polybutadiene with an average particle diameter ($d_{50}$) of 0.3 μm and 60 parts by weight of a styrene-acrylonitrile copolymer consisting of 72 parts by weight of styrene and 28 parts by weight of acrylonitrile with a $M_w$ value of about 80 000 ($M_w/M_n - 1 \leq 2.0$) was treated with 4.2 parts by weight of the polymer in Example 1 and processed at 240° C. to a spiral of about 8 mm in width and about 2 mm in depth, by injection moulding. The length of the spiral was 51 cm. DSC measurements on the pulverulent ABS polymer using a DSC 2- measuring device by the firm Perkin-Elmer resulted in an induction time during the isothermic measurement at 160° C. (rinsing gas oxygen 3.6 l/h) up to the maximum oxidation rate of 67.4 min.

With the dynamic measurement (rinsing gas oxygen 3.6 l/h, heating rate 20 K/min) the maximum of the exothermic reaction was T=220° C.

Example 6 (comparison)

The ABS polymer described in Example 5 was processed under the same conditions without addition of the polymer in Example 1. The length of the spiral was 47 cm.

DSC measurements under identical conditions resulted for the isothermic measurement at 160° C. in an induction time up to the maximum oxidation rate of 3.8 min. With the dynamic measurement, the maximum of the exothermic reaction was T=190.5° C.

We claim:

1. Sulphur-containing copolymers with an intrinsic viscosity of from 2 to 15 ml/g, measured in dimethyl formamide at 25° C., and a sulphur content of from 1.15 to 3.95% by weight, whereby at least 90% by weight of the incorporated sulphur is present as a constituent of terminal $C_{1-18}$-thioalkyl groups, produced by polymerizing a mixture of
    (a) from 50 to 80 parts by weight of styrene, α-methyl styrene, p-methyl styrene, a mixture of styrene, α-methyl styrene and p-methyl styrene, or vinyl toluene,
    (b) from 10 to 30 parts by weight of (meth)acrylonitrile and
    (c) as many parts by weight of a $C_{1-18}$-alkyl mercaptan or mixtures thereof as produce a sulphur content of from 1.15 to 3.95% by weight in the polymer.

2. Sulphur-containing copolymer according to claim 1 produced by polymerizing a mixture of from 50 to 80 parts by weight of (a), from 10 to 30 parts by weight of (b) and as (c) 7.5 to 25 parts by weight of tert.-dodecyl mercaptan, n-dodecyl mercaptan or mixtures thereof.

3. Sulphur-containing copolymer with an intrinsic viscosity of from 2 to 15 ml/g, measured in dimethyl formamide at 25° C., and a sulphur content of from 1.15 to 3.95% by weight, whereby at least 90% by weight of the incorporated sulphur is present as a constituent of terminal $C_{1-18}$-thioalkyl groups produced by polymerizing a mixture of
    (a) from 25 to 75 parts by weight of styrene, α-methyl styrene, p-methyl styrene, a mixture of styrene, α-methyl styrene and p-methyl styrene, or vinyl toluene.
    (b) from 25 to 75 parts by weight of methyl methacrylate and
    (c) as many parts by weight of a $C_{1-18}$-alkyl mercaptan or mixtures thereof as produce a sulphur content of from 1.15 to 3.95% by weight in the polymer.

4. Sulphur-containing copolymer according to claim 3 characterised in that it is produced by polymerizing a mixture of from 25 to 75 parts by weight of (a), from 25 to 75 parts by weight of methyl methacrylate and as (c) 7.5 to 25 parts by weight of tert.-dodecyl mercaptan, n-dodecyl mercaptan or mixtures thereof.

5. A sulphur-containing copolymer with an intrinsic viscosity of from 2 to 15 ml/g, measured in dimethyl formamide at 25' C., and a sulphur content of from 1.15 to 3.95% by weight, wherein at least 90% by weight of the incorporated sulphur is present as a constituent of terminal $C_{1-18}$-thioalkyl groups, produced by polymerizing a monomer mixture comprising
    (a) from 10 to 60 parts by weight of styrene, α-methyl styrene, p-methyl styrene, a mixture of styrene, α-methy styrene and p-methyl styrene, or vinyl toluene,
    (b) from 10 to 60 parts by weight of methyl methacrylate and from 10 to 30 parts by weight of (meth)acrylonitrile,
    (c) as many parts by weight of at least one $C_{1-18}$alkyl mercaptan or mixtures thereof as produce a sulphur content of from 1.15 to 3.95% by weight in the polymer.

6. Sulphur-containing copolymer according to claim 5 produced by polymerizing a mixture of from 10 to 60 parts by weight of (a), from 10 to 60 parts by weight of (b), from 10 to 30 parts by weight of (meth)acrylonitrile and as (c) 7.5 to 25 parts by weight of tert.-dodecyl mercaptan, n-dodecyl mercaptan or mixtures thereof.

7. Sulphur-containing copolymer with an intrinsic viscosity of from 2 to 15 ml/g, measured in dimethyl formamide at 25° C., and a sulphur content of from 1.15 to 3.95% by weight, whereby at least 90% by weight of the incorporated sulphur is present as a constituent of terminal $C_{1-18}$-thioalkyl groups produced by polymerizing a mixture of (a) from 50 to 80 parts by weight of methyl methacrylate, (b) from 10 to 30 parts by weight of (meth)acrylonitrile and (c) as many parts by weight of a $C_{1-18}$-alkyl mercaptan or mixtures thereof as produce a sulphur content of from 1.15 to 3.95% by weight in the polymer.

8. Sulphur-containing polymer according to claim 7 produced by polymerizing a mixture of from 50 to 80 parts by weight of (a), from 10 to 30 parts by weight of (meth)acrylonitrile and as (c) 7.5 to 25 parts by weight of tert.-dodecyl mercaptan, n-dodecyl mercaptan or mixtures thereof.

9. A process for the production of sulphur-containing copolymers according to claim 1 with an intrinsic visocity of from 2 to 15 ml/g, measured in dimethyl formamide at 25° C., wherein the monomers are polymerized in the presence of a $C_{1-18}$-alkyl mercaptan or mixtures thereof in quantities of from (0.503 X+1.222)% by weight to (1.728 X+4.197)% by weight, based on the sum of the monomer and mercaptan quantity, whereby X represents the number of carbon atoms in the alkyl mercaptan.

10. A process for the production of sulphur-containing copolymers according to claim 3 with an intrinsic visocity of from 2 to 15 ml/g, measured in dimethyl formamide at 25° C., wherein the monomers are polymerized in the presence of a $C_{1-18}$-alkyl mercaptan or mixtures thereof in quantities of from (0.503 X+1.222)% by weight to (1.728 X+4.197)% by weight, based on the sum of the monomer and mercaptan quantity, whereby X represents the number of carbon atoms in the alkyl mercaptan.

11. A process for the production of sulphur-containing copolymers according to claim 7 with an intrinsic visocity of from 2 to 15 ml/g, measured in dimethyl formamide at 25° C., wherein the monomers are polymerized in the presence of a $C_{1-18}$-alkyl mercaptan or mixtures thereof in quantities of from (0.503 X+1.222)% by weight to (1.728 X+4.197)% by weight, based on the sum of the monomer and mercaptan quantity, whereby X represents the number of carbon atoms in the alkyl mercaptan.

* * * * *